United States Patent
Hofheinz et al.

(10) Patent No.: US 7,966,657 B2
(45) Date of Patent: Jun. 21, 2011

(54) METHOD FOR A SECURE INFORMATION TRANSFER

(75) Inventors: Walter-Jürgen Hofheinz, München (DE); Dietmar Scharf, Amberg (DE); Karl-Heinrich v. Stein-Lausnitz, München (DE)

(73) Assignee: Siemens Aktiengesellschaft, Munich (DE)

( * ) Notice: Subject to any disclaimer, the term of this patent is extended or adjusted under 35 U.S.C. 154(b) by 1043 days.

(21) Appl. No.: 10/474,052

(22) PCT Filed: Apr. 3, 2002

(86) PCT No.: PCT/DE02/01211
§ 371 (c)(1),
(2), (4) Date: Oct. 6, 2003

(87) PCT Pub. No.: WO02/082768
PCT Pub. Date: Oct. 17, 2002

(65) Prior Publication Data
US 2004/0148522 A1    Jul. 29, 2004

(30) Foreign Application Priority Data
Apr. 5, 2001 (DE) .................. 101 17 033

(51) Int. Cl.
*G06F 7/04* (2006.01)
(52) U.S. Cl. .................. 726/17; 726/4; 726/16; 726/21; 709/227; 709/28; 713/186
(58) Field of Classification Search .................. 709/227, 709/228; 726/4, 16, 17, 21; 713/186
See application file for complete search history.

(56) References Cited

U.S. PATENT DOCUMENTS

| 5,812,819 | A  | * | 9/1998  | Rodwin et al. ............... 703/23 |
| 6,081,900 | A  | * | 6/2000  | Subramaniam et al. ...... 726/19 |
| 6,230,002 | B1 | * | 5/2001  | Floden et al. ............... 455/411 |
| 6,233,608 | B1 | * | 5/2001  | Laursen et al. .............. 709/217 |
| 6,490,687 | B1 | * | 12/2002 | Nagai ........................... 726/9 |
| 6,614,774 | B1 | * | 9/2003  | Wang ........................... 370/338 |
| 6,745,030 | B2 | * | 6/2004  | Koyama ....................... 455/433 |
| 6,978,376 | B2 | * | 12/2005 | Giroux et al. ................ 713/189 |
| 7,024,692 | B1 | * | 4/2006  | Schanze et al. .............. 726/10 |
| 7,036,010 | B2 | * | 4/2006  | Wray ........................... 713/151 |

(Continued)

FOREIGN PATENT DOCUMENTS

EP          0 913 966           5/1999

(Continued)

*Primary Examiner* — Edan Orgad
*Assistant Examiner* — Roderick Tolentino
(74) *Attorney, Agent, or Firm* — Staas & Halsey LLP

(57) ABSTRACT

A method of securely transmitting information between a user device and a central computing device, located in a self-contained network. The method includes: sending a request from the user device to a second computing device located outside of the self-contained network to connect with the central computing device; transmitting from the second network device to a third computing device located in the self-contained network a message containing a unique identification; storing in a database, via the third computing device, the unique identification when the identification is validated, and sending, via the third computing device, a confirmation message to the second computing device; and initializing a connection with the central computing device through the user device, using information contained in the confirmation message to initialize a connection with the central computing device, and the connection through the central computing device is accepted when access by the user device is authorized.

15 Claims, 2 Drawing Sheets

U.S. PATENT DOCUMENTS

| | | | |
|---|---|---|---|
| 7,137,006 B1 * | 11/2006 | Grandcolas et al. | 713/180 |
| 7,185,360 B1 * | 2/2007 | Anton et al. | 726/3 |
| 2001/0016492 A1 * | 8/2001 | Igarashi et al. | 455/433 |
| 2001/0054157 A1 * | 12/2001 | Fukumoto | 713/201 |
| 2002/0078379 A1 * | 6/2002 | Edwards et al. | 713/201 |
| 2002/0144128 A1 * | 10/2002 | Rahman et al. | 713/186 |

FOREIGN PATENT DOCUMENTS

| | | |
|---|---|---|
| EP | 0913966 A2 | 5/1999 |
| WO | WO 98/58473 | 12/1998 |

* cited by examiner

METHOD FOR A SECURE INFORMATION TRANSFER

CROSS REFERENCE TO RELATED APPLICATIONS

This application is based on and hereby claims priority to PCT Application No. PCT/DE02/01211 filed on Apr. 3, 2002 and German Application No. 101 17 033.5 filed on Apr. 5, 2001, the contents of which are hereby incorporated by reference.

BACKGROUND OF THE INVENTION

The present invention relates to a method of transferring secure information between two terminals.

As a result of an increasingly global alignment of companies, telecommunication services are increasingly being used to transfer voice and data. The costs resulting from these telecommunication services are constantly rising and are becoming a significant cost factor for the companies, which are looking for opportunities to reduce these costs. Local and global computer networks such as an 'Intranet' or the 'Internet' provide an option of transferring data less expensively and all around the world.

For access to data or services—for example to a server or to an application made available by the server—of a first unit—for example a Company A—originating from a second unit—for example a Company B—or originating from a public access—for example from the 'Internet'—it is important to prevent unauthorized access to data or services of the unit. This can be done by an access authorization check performed prior to the data access. With an authorization check it is necessary for there to be authorization administration in the first unit to administer the access rights of the individual users. A disadvantage of this type of authorization check is that the access rights for the external users to the first unit must be notified (danger of misuse) and that a user must re-register independently in each case before a data access. Furthermore the authorization administration must be updated on an ongoing basis which involves great administrative expense.

For secure data access originating from a second unit—for example originating from a user device in an Intranet of Company B—there is also the option of routing the access via an existing transmission facility existing between the units. A transmission device in this sense is for example, a fixed connection—that is, a physical line connection set up especially for the purpose—or a logical connection—also referred to as a Virtual Private Network (VPN). Alternatively, a representative device—known as a proxy—can be defined in the second unit, via which accesses to the first unit or to a server of the first unit will be undertaken.

A disadvantage of these possible solutions is, however, that a data access to the first unit must always be routed via the fixed connection or that the data access must always take place via the proxy.

SUMMARY OF THE INVENTION

One of the objects of the present invention is to specify an alternate procedure through which there can be secure external access to data or services of a self-contained unit.

This object can be achieved by a method to securely transmit information between a user device and a central computing device, located in a self-contained network.

One of the advantages of the method in accordance with the invention is that the method can be implemented in existing systems with only a small amount of effort.

Another advantage of the method in accordance with the invention is that no information about the individual authorized external users has to be stored in the first unit. This means that the burden of administration in the unit can be greatly reduced.

The HTTPS protocol (HTTPS: HyperText Transport Protocol Secure) may be used for data transmission between the individual units involved in the method, in accordance with the invention, and in additional encryption of the data to be transmitted. For example, via the familiar PGP procedure (PGP: Pretty Good Privacy), a public network, an unauthorized data access to the transmitted data is prevented.

BRIEF DESCRIPTION OF THE DRAWINGS

These and/or other objects and advantages of the present invention will become more apparent and more readily appreciated from the following description of the preferred embodiments, taken in conjunction with the accompanying drawings of which.

DETAILED DESCRIPTION OF EMBODIMENTS

Figure 1:
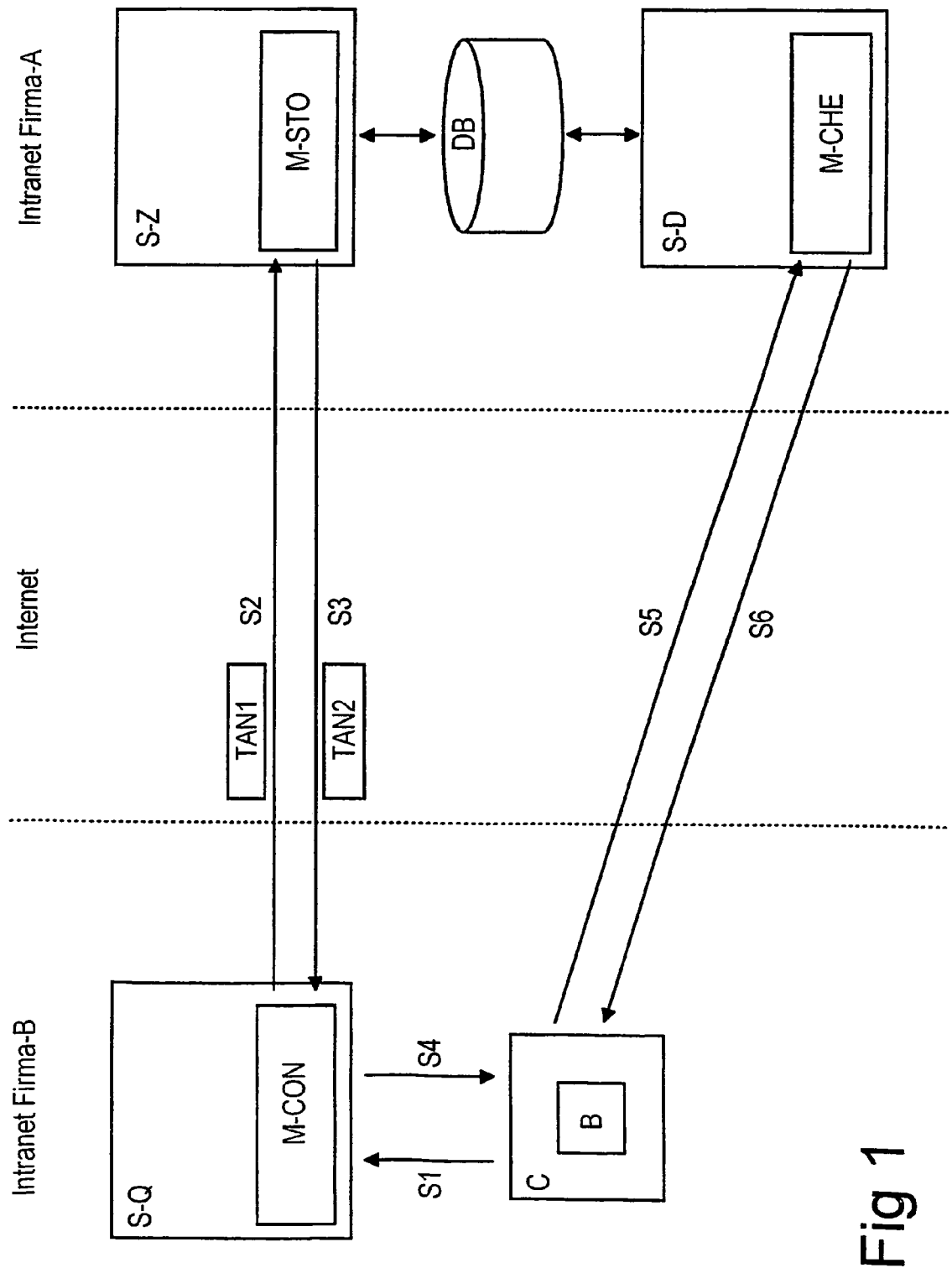
FIG. 1 is a block diagram for schematic representation of the major functional units involved in the method in accordance with the invention.

Reference will now be made in detail to embodiments of the present invention, examples of which are illustrated in the accompanying drawings, wherein like reference numerals refer to like elements throughout.

FIG. 1 shows a block schematic of an Intranet of a first unit Company A and an Intranet of a second unit Company B. The two Intranets are connected to each other by the publicly accessible Internet. Intranet, as used in the present specification, means a local computer network in which accesses to the network originating from a network-external installation are only possible with an appropriate access authorization.

A data server S-D is located in the Intranet of the first unit Company A through which the data or services for internal users of the Intranet—not shown in the diagram—are provided. For access to the data or services of the data servers S-D originating from an external user device—i.e. in the present exemplary embodiment originating from the Intranet of the second unit Company B or originating from the Internet—it is necessary for the user to be authenticated as authorized before access.

The figure shows a user device C and a source server S-Q, which are both located in the Intranet of the second unit Company B. Access to the data or services of the data server S-D originating from the external user device C are initialized by activating a link to a browser B running on a user device C. Instead of setting up a direct connection to the data server S-D, in accordance with this embodiment of the present invention, in a first step S1 a connection is established to the source server S-Q and on the source server S-Q a connection module M-CON is activated.

In a second step S2 the connection module M-CON then sends a message TAN1 over the Internet to a destination server S-Z located in the Intranet of the first unit Company A. The message TAN1 in this case contains a unique identification SessionID. The connection module M-CON ensures here that the identification SessionID is unique and one-off, i.e. that the identification SessionID is only valid for what is referred to as a session. With the receipt of the message TAN1 a storage module M-STO is activated on the destination server S-Z. Message TAN1 is transmitted over the Internet in this case on the basis of the familiar HTTPS protocol. In addition message TAN1 is encrypted before its transmission by the connection module M-CON. The familiar PGP (PGP: Pretty Good Privacy) procedure is typically used for encryption. In this case message TAN2 will be encrypted with a public key assigned to storage module M-STO.

Figure 2:
FIG. 2 is a block diagram for schematic representation of a typical message TAN1.

FIG. 2 shows a schematic diagram of a typical message TAN1. Message TAN1 includes a specific CompanyID for the second unit Company B of the connection module M-CON and the SessionID already mentioned above. The SessionID identification is typically a 64-bit integer. After the SessionID there is a time identifier TANCreationTime, which for example specifies the number of milliseconds, which have elapsed since Jan. 1, 1970 up to the point of creation of message TAN1. Finally, message TAN1 includes a TANExtension, which is typically generated by a random number.

Referring again to FIG. 1, in cases in which the message TAN1 is decryptable by storage module M-STO using a private key assigned to the storage module M-STO and the identification SessionID is recognized as valid, the identification SessionID is stored along with period of validity information in a database DB located in the Intranet of the first unit Company A. The period of validity information specifies in this case for how long the data transferred in the confirmation is valid.

When the Session ID identification is recognized as invalid, and error message is returned in a step S3 to the connection module M-CON. In cases in which the Session ID identification is by contrast recognized as valid, a confirmation message TAN2 is returned in a step S3 to the connection module M-CON. The confirmation message TAN2 is again transmitted over the Internet in this case on the basis of the HTTPS protocol. In addition confirmation message TAN2 will be encrypted before transmission by storage module M-STO. The PGP procedure is again used as encryption procedure. Here confirmation message TAN2 will be encrypted with a public key assigned to connection module M-CON. Connection module M-CON can decrypt the received confirmation message TAN2 using a private key assigned to the connection module M-CON.

Figure 3:
FIG. 3 is a block diagram for schematic representation of a typical confirmation TAN2.

FIG. 3 shows a schematic diagram of a typical confirmation message TAN2. Confirmation message TAN2 comprises two parts. The first part includes an address information URL with which the data or services of data server S-D can be accessed. The second part corresponds to message TAN1 or contains a SessionID identification created by storage module M-STO constructed in accordance with unique and similar principles which can be uniquely assigned by connection module M-CON to the message TAN2 created there. For example the confirmation message TAN2 could have the following form: https://www.firma-a.com/servlet/M-CHE?RequestID=5634636&CompanyID=Company-a&SessionID=23497278&TANCreationTIME=293478293&TANExtension=29347293439

The fact that the current address information URL required for access to data server S-C is transmitted in confirmation message TAN2 to connection module M-CON means that a user does not have to know the address information URL before a data access. In addition the address information URL can be changed in any way required in the first unit Company A.

If connection module M-CON has received and decrypted a confirmation message TAN2, in a step S4, controlled by connection module M-CON, a page is output on browser B of user device C containing the address information URL in the form of a link.

When the link is called, a connection is established in a step S5 via the Internet to data server S-D and a checking module M-CHE is started on data server S-D. The checking module M-CHE checks the SessionID identification transferred during the connection setup against the SessionID identification stored in the database DB. If the check on the SessionID identifications delivers a positive result and if the period of validity of the identification ID has not yet expired, in a sixth step S6 a connection between the user device C and the data server S-D will be established over the Internet so that subsequently access originating from the external user device to the data and services of data server S-D is possible. Data is again transmitted over the Internet between user device C and data server S-D on the basis of the HTTPS protocol.

The SessionID identification is only valid for a one-off connection setup with checking module M-CHE. A further connection setup with data server S-D originating from an external user device with the same identification SessionID is no longer possible, i.e. the identification SessionID is no longer classified as valid for the second data access. This allows a subsequent access by an unauthorized user who has subsequently obtained knowledge of the SessionID identification to be suppressed.

Use of the HTTPS protocol ensures that so-called "eavesdropping" of the data transmitted in the Internet is prevented. The additional encryption of the data with the public keys of the connection module M-CON and the storage module M-STO additionally makes "eavesdropping" of the data transmitted in the Intranets of the first and second unit Company A, Company B impossible.

Connection module M-CON, storage module M-STO and checking module M-CHE are advantageously realized as what are known as "Servlets° i.e. they are applications running on the relevant servers—the source server S-Q, the destination server S-Z and the data server S-D—but are controlled by entries made in browser B of user device C.

In another embodiment of the invention, all users of the Intranet of the second unit Company B have access to the source server S-Q or to the connection module M-CON running on source server S-Q. This defines the restricted group of people for access to the data or services of data server S-D by the users of the Intranet of the second unit Company B. Alternately provision can also be made for the source server S-Q to be located in the Internet—accessible to all users—whereby in this case a self-contained group of users is defined for access to connection module M-CON in source server S-Q.

One of the advantages is that no authorized user administration is required in data server S-D so that access rights for the users do not have to be notified to the first unit Company A. A user accesses the data or services of data server S-D is therefore anonymous as far as the first unit Company A is concerned. A further advantage of the method in accordance with the invention is that a user of the authorization preceding the access to the data or services does not acquire any knowledge of it. The method in accordance with the invention is thus shown to be very user-friendly.

The invention has been described in detail with particular reference to embodiments thereof and examples, but it will be understood that variations and modifications can be effected within the spirit and scope of the invention.

The invention claimed is:

1. A method for connecting a user device located in a first intranet and a data server located in a second intranet, comprising:

sending a request from the user device located in the first intranet to a first computing device located in the first intranet to connect with the data server located in the second intranet;

generating, by a connection module of the first computing device, a unique session identification for a subsequent connection setup between the user device and the data server, the unique session identification being valid for only one connection setup;

transmitting from the first computing device to a second computing device located in the second intranet a request message containing an identification of the first intranet company and the unique session identification;

validating the unique session identification at the second intranet;

after validating the unique session identification, storing in a database located in the second intranet, via a storage module of the second computing device, the unique session identification, and sending, via the second computing device, a confirmation message to the connection module of the first computing device, wherein said confirmation message comprises address information related to the data server;

sending said address information and the unique session identification from the connection module of the first computing device to the user device;

initializing a connection to the data server by the user device, using said address information and the unique session identification;

before accepting the connection, performing an authorization check by the data server, the authorization check being performed by comparing the unique session identification received from the user device with the unique session identification stored in the database; and accepting the connection between the data server and the user device if access by the user device is recognized through said authorization check.

2. The method according to claim 1, further comprising signaling a connection request from a browser call of the user device, to the connection module of the first computing device.

3. The method according to claim 2, wherein access to the connection module is limited to authorized individuals.

4. The method according to claim 2, wherein:

the unique session identification is transmitted to the storage module of the second computing device via the connection module;

the validated session identification is stored in the database via the storage module; and the confirmation message is sent to the connection module of the first computing device.

5. The method according to claim 4, further comprising transmitting data between the connection module and the storage module in accordance with the HTTPS protocol.

6. The method according to claim 4, further comprising transmitting encrypted data between the connection module and the storage module.

7. The method according to claim 2, further comprising displaying address information controlled by the connection module as a link to the browser.

8. The method according to claim 7, further comprising executing a checking module on the data server, when the user device requests to connect, and automatically transferring the unique session identification to the checking module.

9. The method according to claim 8, further comprising:

establishing, when access by the user device is recognized through the unique session identification stored in the database, a connection between the browser and the checking module; and transmitting to the browser, when access by the user device is identified as invalid, an error message via the checking module.

10. The method according to claim 8, wherein data is transmitted between the browser and the checking module in accordance with the HTTPS protocol.

11. The method according to claim 1, wherein the unique session identification is valid for a limited time.

12. The method according to claim 5, further comprising transmitting encrypted data between the connection module and the storage module.

13. The method according to claim 9, wherein data is transmitted between the browser and the checking module in accordance with the HTTPS protocol.

14. A method for connecting a user device located in a first intranet and a data server located in a second intranet, comprising:

sending a request from the user device located in the first intranet to a first computing device located in the first intranet to connect with the data server located in the second intranet;

generating, by a connection module of the first computing device, a unique session identification for a subsequent connection setup between the user device and the data server, the unique session identification being valid for only one connection setup, the unique session identification not identifying access rights of an individual user;

transmitting from the first computing device to a second computing device located in the second intranet a request message containing an identification of the first intranet company and the unique session identification;

validating the unique session identification at the second intranet;

after validating the unique session identification, storing in a database located in the second intranet, via a storage module of the second computing device, the unique session identification, and sending, via the second computing device, a confirmation message to the connection module of the first computing device, wherein said confirmation message comprises address information related to the data server;

sending said address information and the unique session identification from the connection module of the first computing device to the user device;

initializing a connection to the data server by the user device, using said address information and the unique session identification;

before accepting the connection, performing an authorization check by the data server, the authorization check being performed by comparing the unique session identification received from the user device with the unique session identification stored in the database; and accepting the connection between the data server and the user device if access by the user device is recognized through said authorization check.

15. A method for connecting a user device located in a first intranet and a data server located in a second intranet, comprising:

sending a request from the user device located in the first intranet to a first computing device located in the first intranet to connect with the data server located in the second intranet;

generating by a connection module of the first computing device a unique session identification for a subsequent connection setup between the user device and the data server, the unique session identification being valid for only one connection setup;

transmitting from the first computing device to a second computing device located in the second intranet a request message containing an identification of the first intranet company and the unique session identification;

validating the unique session identification at the second intranet;

after validating the unique session identification, storing in a database located in the second intranet, via a storage module of the second computing device, the unique session identification along with an information about a period of validity expiry of the unique session identification, and sending, via the second computing device, a confirmation message to the connection module of the first computing device, wherein said confirmation message comprises address information related to the data server;

sending said address information and the unique session identification from the connection module of the first computing device to the user device as a link;

activating the link at the user device to thereby initialize a connection to the data server by the user device, using said address information and the unique session identification;

before accepting the connection, performing an authorization check by the data server, the authorization check being performed by comparing the unique session identification received from the user device with the unique session identification stored in the database;

accepting the connection between the data server and the user device if access by the user device is recognized through said authorization check and the period of validity stored in the database indicates that the unique session identification transmitted by the user device has not expired; and securely transmitting information over the connection between the user device and the data server if the connection was accepted.

* * * * *